US007000889B2

(12) United States Patent
Kah, Jr. et al.

(10) Patent No.: US 7,000,889 B2
(45) Date of Patent: Feb. 21, 2006

(54) TILTED AND STEPPED DIAPHRAGM FOR CONTROL VALVES

(76) Inventors: Carl L. C. Kah, Jr., 11517 Turtle Beach Rd., Lost Tree, North Palm Beach, FL (US) 33408; Carl L. C. Kah, III, 778 Lakeside Dr., North Palm Beach, FL (US) 33408

( * ) Notice: Subject to any disclaimer, the term of this patent is extended or adjusted under 35 U.S.C. 154(b) by 0 days.

(21) Appl. No.: 10/999,485

(22) Filed: Nov. 30, 2004

(65) Prior Publication Data

US 2005/0077490 A1 Apr. 14, 2005

Related U.S. Application Data

(62) Division of application No. 10/118,490, filed on Apr. 4, 2002.

(60) Provisional application No. 60/280,997, filed on Apr. 4, 2001.

(51) Int. Cl.
*F16K 51/00* (2006.01)

(52) U.S. Cl. ..................... 251/30.01; 251/61; 251/285; 251/331; 251/335.2

(58) Field of Classification Search ............. 251/30.01, 251/30.02, 30.03, 30.04, 30.05, 61.1, 331, 251/335.2, 285, 61, 61.2, 61.3, 61.4, 61.5
See application file for complete search history.

(56) References Cited

U.S. PATENT DOCUMENTS

| | | | |
|---|---|---|---|
| 2,936,780 A | 5/1960 | Pratt | |
| 2,953,248 A | 9/1960 | Troland | |
| 3,103,338 A | 9/1963 | Marmo | |
| 3,379,406 A | 4/1968 | Greer | |
| 3,439,895 A | 4/1969 | Marandi | |
| 3,476,353 A | 11/1969 | Stampfli | |
| 3,544,062 A | 12/1970 | Murray et al. | |
| 3,666,235 A | 5/1972 | Scott | |
| 4,108,419 A | 8/1978 | Sturman et al. | |
| 4,301,992 A | 11/1981 | Karbo | |
| 4,309,022 A | 1/1982 | Reinicke et al. | |
| 4,310,023 A | 1/1982 | Kah, Jr. | |
| 4,336,918 A | 6/1982 | Karbo | |
| 4,349,045 A | 9/1982 | Kah, Jr. | |
| 4,366,944 A | 1/1983 | Kah, Jr. | |
| 4,477,051 A | 10/1984 | Ben-Yehuda | |
| 4,508,136 A | 4/1985 | Kah, Jr. | |
| 4,671,485 A | 6/1987 | Saarem | |
| 4,972,874 A * | 11/1990 | Jackson | 251/45 |
| 5,213,124 A | 5/1993 | Costa | |
| 5,213,305 A * | 5/1993 | Whiteside et al. | 251/45 |

(Continued)

*Primary Examiner*—John Bastianelli
(74) *Attorney, Agent, or Firm*—Ostrolenk, Faber, Gerb & Soffen, LLP

(57) ABSTRACT

A diaphragm operated valve having the diaphragm attached at its lower end to a valve closure plug, and movable therewith, and attached at its upper end to a portion of valve body that forms the pressure cavity. The diaphragm has a stepped portion between its upper and lower ends which folds back on itself when the valve opens. The valve body has shoulder portions that support the diaphragm when the valve is closed to avoid stressing the diaphragm material due to pressure in the pressure chamber. This allows the outside diameter of the diaphragm to be minimized, and eliminates the need for fabric reinforcement. A filter screen is positioned flush with the surface of the valve plug so that high velocity flow across the screen while the valve is opening and closing removes accumulated dirt thereby making the screen self cleaning.

6 Claims, 11 Drawing Sheets

U.S. PATENT DOCUMENTS 5,269,333 A 12/1993 Richmond
5,645,264 A 7/1997 Kah, Jr.
5,709,370 A 1/1998 Kah, Jr.
6,416,038 B1 7/2002 Sindel et al.

* cited by examiner

100A

TILTED AND STEPPED DIAPHRAGM FOR CONTROL VALVES

CROSS REFERENCE TO RELATED APPLICATIONS

This application is based on and claims benefit of priority to U.S. Provisional Patent Application No. 60/280,997 filed Apr. 4, 2001 entitled TILTED AND STEPPED DIAPHRAGM FOR CONTROL VALVES, the entire disclosure of which is hereby incorporated by reference.

This application is a division of application Ser. No. 10/118,490, filed Apr. 4, 2002 for TILTED AND STEPPED DIAPHRAGM FOR CONTROL VALVES, the entire disclosure of which is hereby incorporated by reference.

BACKGROUND OF THE INVENTION

1. Field of the Invention

The present invention relates to valves used to control the flow of a fluid, such as water, in a conduit. Valves according to the invention have broad utility but are particularly useful in underground sprinkler and irrigation systems, where low part fabrication and assembly costs must be balanced against the need for designs which provide high reliability and durability. The invention also relates to an improved valve diaphragm design, and to the design of an improved self-cleaning filter used in such valves to help prevent malfunctions due to contamination by dirt particles in the water.

2. Relevant Art

Flow control valves used in such applications generally employ liquid-pressure activated diaphragms to control opening and closing by the pressure of the liquid being transported, and can be operated manually or by a pilot mechanism actuated hydraulically or by a low power solenoid. Representative flow control valves are shown in U.S. Pat. Nos. 3,439,895; 4,301,992; 4,336,918; and 4,508,136. U.S. Pat. No. 5,645,264, which is incorporated herein by reference as if fully disclosed, describes a through-flow, diaphragm operated valve which has a circular tilted valve seat and a matching spherical valve plug. These patents, in turn, refer to other patents and valve assemblies.

SUMMARY OF THE INVENTION

The present invention provides several improvements in the design and functionality of flow control valves. A valve according to this invention can be made quite small, yet exhibits notably low pressure drop. The new valve also features a diaphragm of improved design which functions primarily as a seal, and not for pressure transmission. This permits use of a smaller diameter diaphragm than is customary in conventional valves, and also diaphragms which do not require internal fabric layers for added strength. The new diaphragms are therefore simpler to manufacture, and consequently, less costly than conventional diaphragms.

Malfunction due to dirt particles in the water is an ever-present concern in a valve having small passages or rubbing surfaces, and can best be avoided by preventing dirt from entering the valve operating mechanism, e.g., by suitable screening. Provision must be made, however, to clean the screening device.

Conventionally, filter screens are located in the flow path so that cleaning is achieved by through-flow. This, however, tends to increase turbulence, and to damage the screen. According to the invention, the pressure chamber bleed passage extends axially through the valve plug, and a screening device is positioned over the bleed passage opening substantially flush with the surface of the valve plug.

During the opening and closing of the valve, the high pressure differential at the valve opening results in a period of high velocity flow across the surface of the valve plug and across, rather than through the screen. This promotes self-cleaning of the screen, while avoiding problems associated with conventional designs.

According to this invention, low pressure drop is achieved by employing a diaphragm and an associated valve plug aligned with the tilted valve seat, and by providing a relatively straight-line flow path through the valve with smoothly converging flow passage walls toward and away from the valve seat.

Reduced outside diaphragm diameter and reduced material pressure stresses are achieved by employing an axially stepped diaphragm of unique design. The diaphragm is extended axially, rather than radially to accommodate the required axial movement of the valve plug. Also, the diaphragm has a large central opening relative to its outside diameter, and the margins of the central opening are sealingly attached to the periphery of the valve plug. This permits the diaphragm to serve mainly as a seal, and the pressure differential in the pressure chamber by which the valve plug is moved to open and close the valve, acts directly to the surface of the valve plug, and only minimally on the diaphragm.

When the valve is closed, the diaphragm is supported against the forces in the pressure chamber by the structure of the valve body. When the valve opens, the small radial portion of the diaphragm moves axially with the closure member, and the diaphragm flexes so that the axial portion folds back in the direction of movement of the valve closure member to accommodate the movement of the valve closure member, and thus the axial portion becomes generally U-shaped when the valve is open.

In a first embodiment, the valve seat and the valve top member are tilted, i.e., positioned obliquely, relative to the flow path. The valve is switched between its open and closed positions by a solenoid-activated pilot mechanism, or by manual bleed of the pressure above the diaphragm in the pressure chamber. In a variant of the first embodiment, there is also provided a manually operated throttling mechanism for controlling the maximum flow through the valve when it is opened. In these embodiments, the axis of the pilot valve actuator solenoid (and the throttle) are oriented perpendicular to the tilted plane of the valve seat.

In another embodiment, the design is such that a valve top housing cover is oriented parallel to the flow axis of the valve while still having a tilted diaphragm. This allows more convenient access to internal components when necessary for maintenance.

In a further embodiment, there is no external actuator, and the valve is operated solely by internal hydraulic pressure, as described in above-referenced U.S. Pat. No. 5,645,264, the disclosure of which is incorporated herein by reference as if fully disclosed.

It is accordingly a primary object of this invention is to provide a pressure operated control valve which is of small size yet exhibits a notably low pressure drop for its size, and which employs a diaphragm of improved design.

It is another object of the present invention to provide such a valve which is unique for its simplicity and low manufacturing cost, while still exhibiting low pressure drop, reliable operation, and resistance to malfunction due to contamination by dirt particles.

A further object of the invention is to provide a simple, low-manufacturing-cost, stepped diaphragm design that permits the valve plug to travel sufficiently despite the reduced outside diameter and overall valve size to achieve low pressure loss, and also reduced pressure stresses in the diaphragm material without the need for diaphragms having a large diameter or employing fabric layers for strengthening.

An additional object of the invention is to provide a self-cleaning bleed passage filter configuration in which cleaning if effected by flow across, rather than through, the filter.

Yet another object of the invention is to provide a valve design in which a cover providing access to the internal valve elements is parallel to the flow axis of the valve while still having a tilted diaphragm that promotes uniform application of forces on the valve plug during closing, and consequently, smoother operation.

Other features and advantages of the present invention will become apparent from the following description of the invention which refers to the accompanying drawings, wherein like parts are given the same reference numerals.

BRIEF DESCRIPTION OF THE DRAWING(S)

DETAILED DESCRIPTION OF EMBODIMENTS OF THE INVENTION

Figure 1:
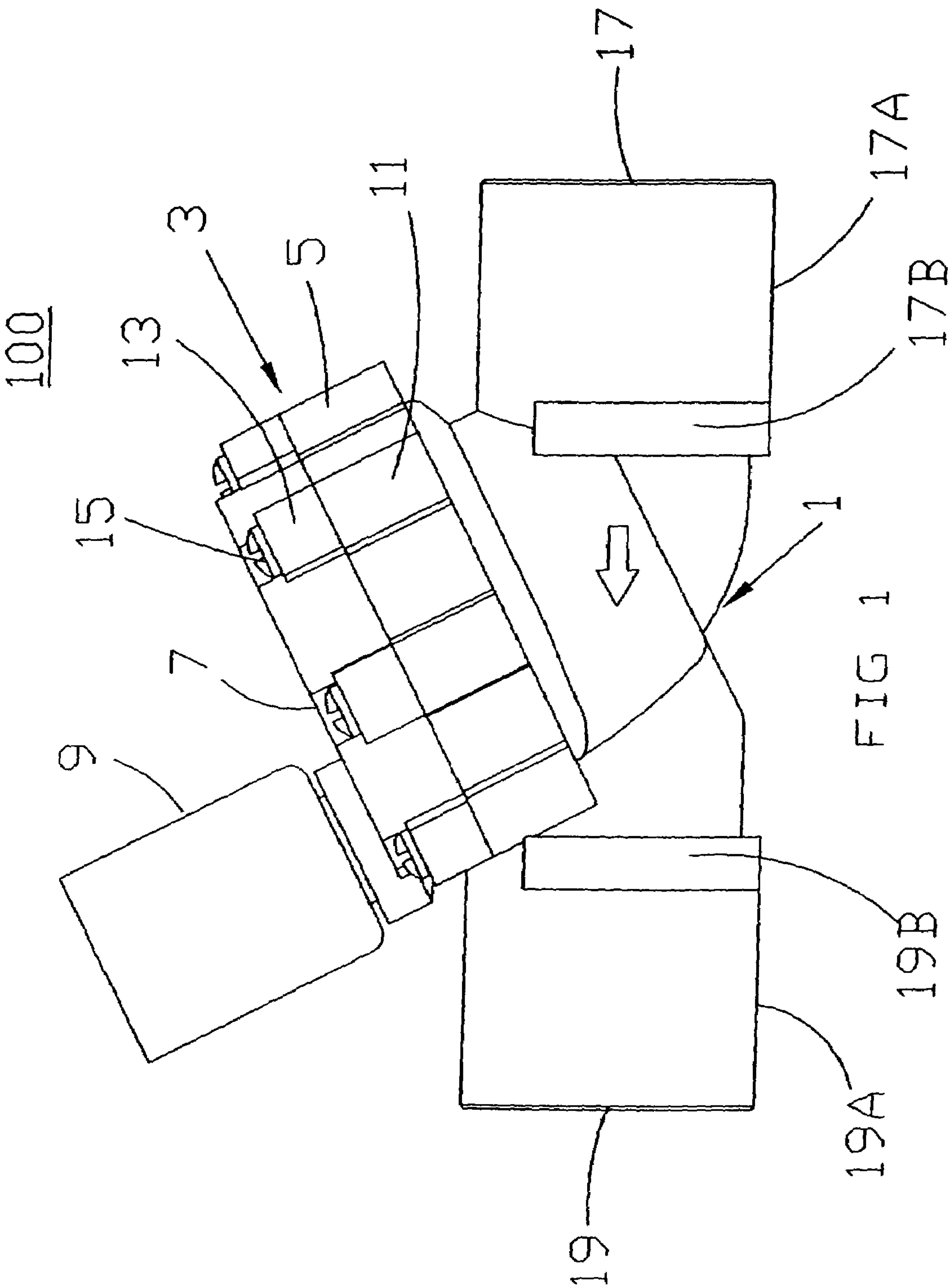
FIG. 1 is a side elevation view of a flow control valve according to a first embodiment of the invention having a solenoid-operated pilot valve design.
Figure 2:
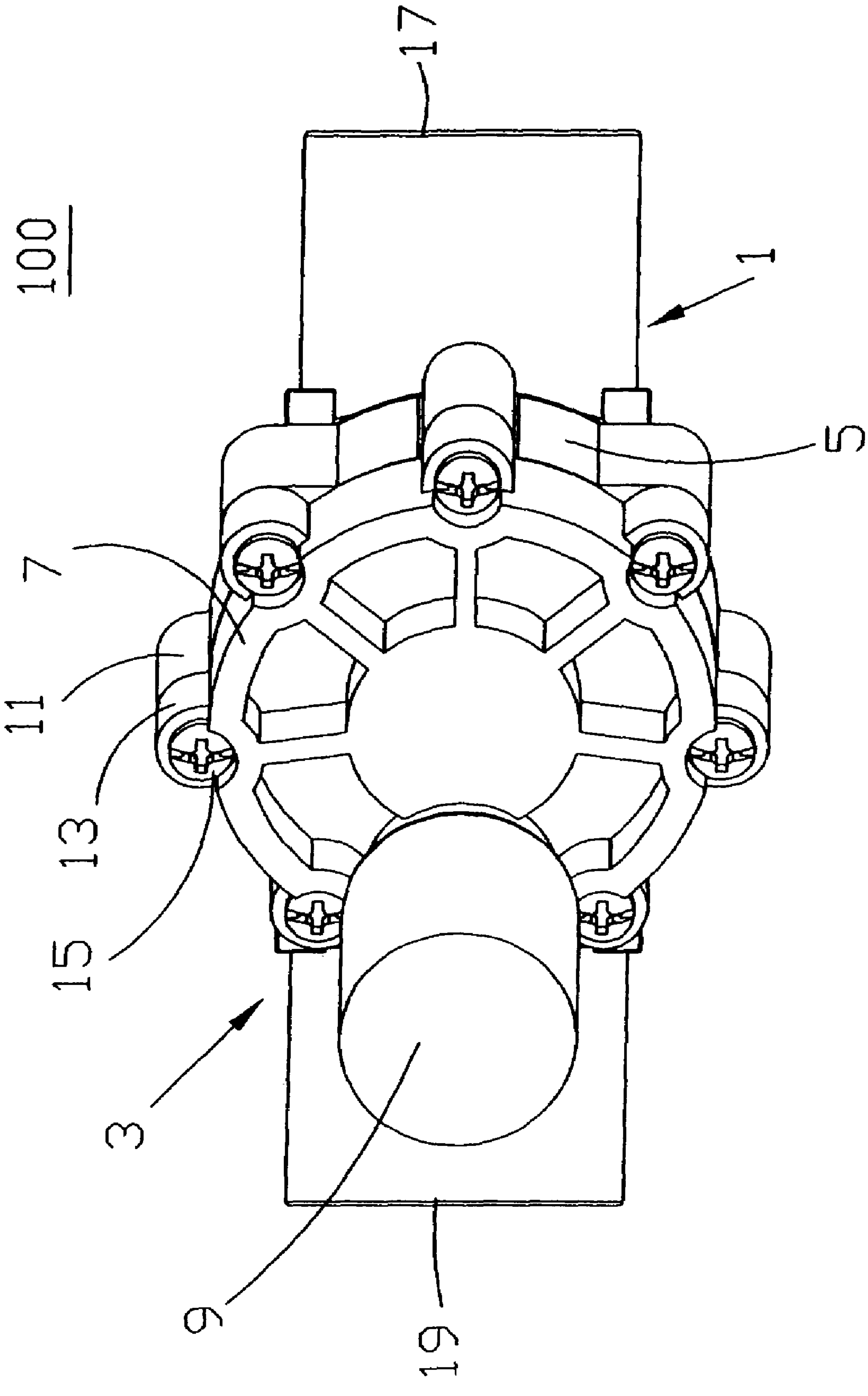
FIG. 2 is a top view of a flow control valve in FIG. 1.

Referring first to FIGS. 1 and 2, a tilted seat, low pressure drop, flow control valve generally denoted at 100, includes a main valve body 1, a control housing 3 formed by an upward extension 5 of main body 1, and a top member 7, and a solenoid 9 that operates the pilot control valve. Body extension 5 and top member 7 include peripherally spaced aligned ears 11 and 13 respectively which receive suitable screws 15 to secure the two parts together. Valve body 1 and top member 7 are advantageously formed of any suitable molded plastic.

Figure 3:
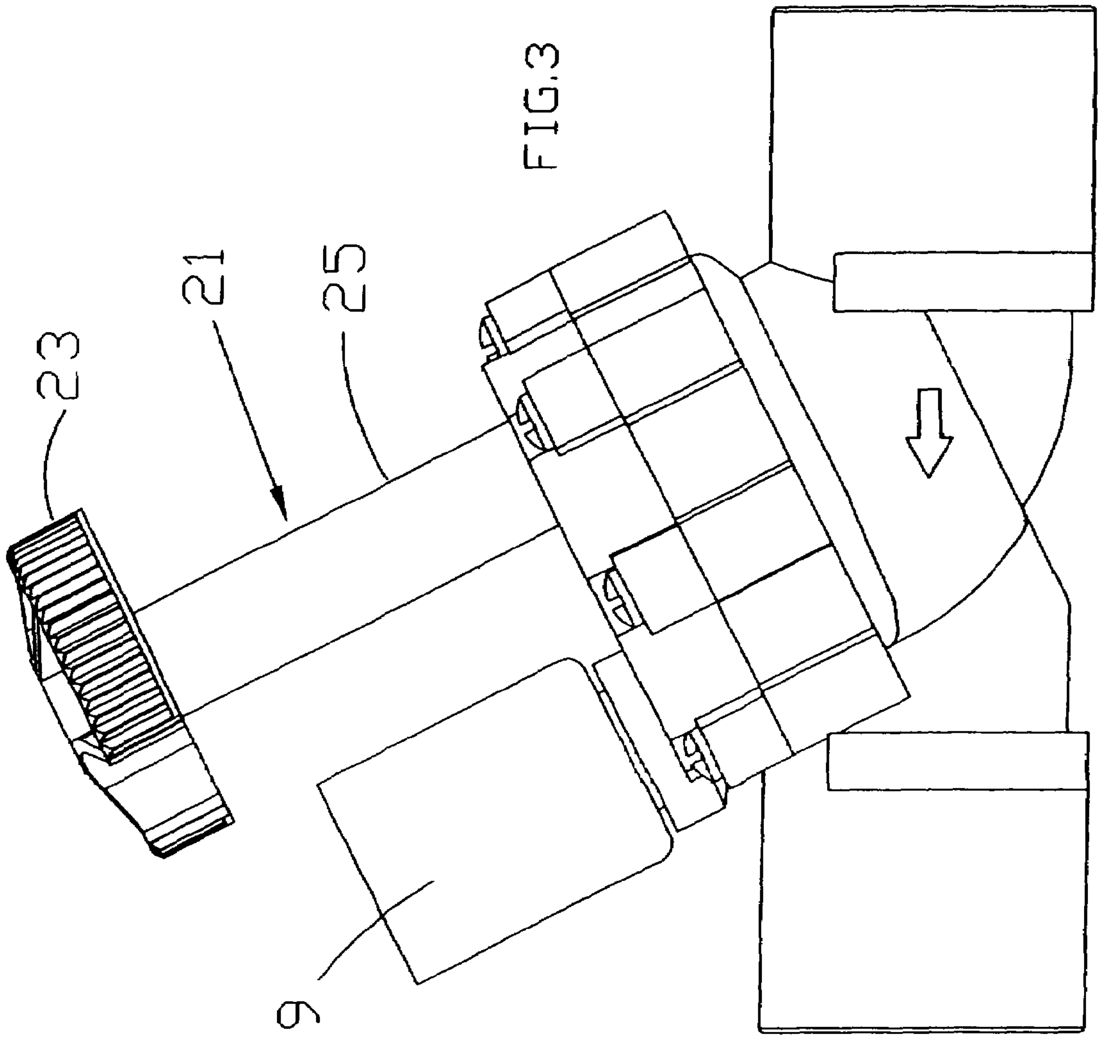
FIG. 3 is a side elevation view of a flow control valve according to a second embodiment of the invention with a throttle added.
Figure 4:
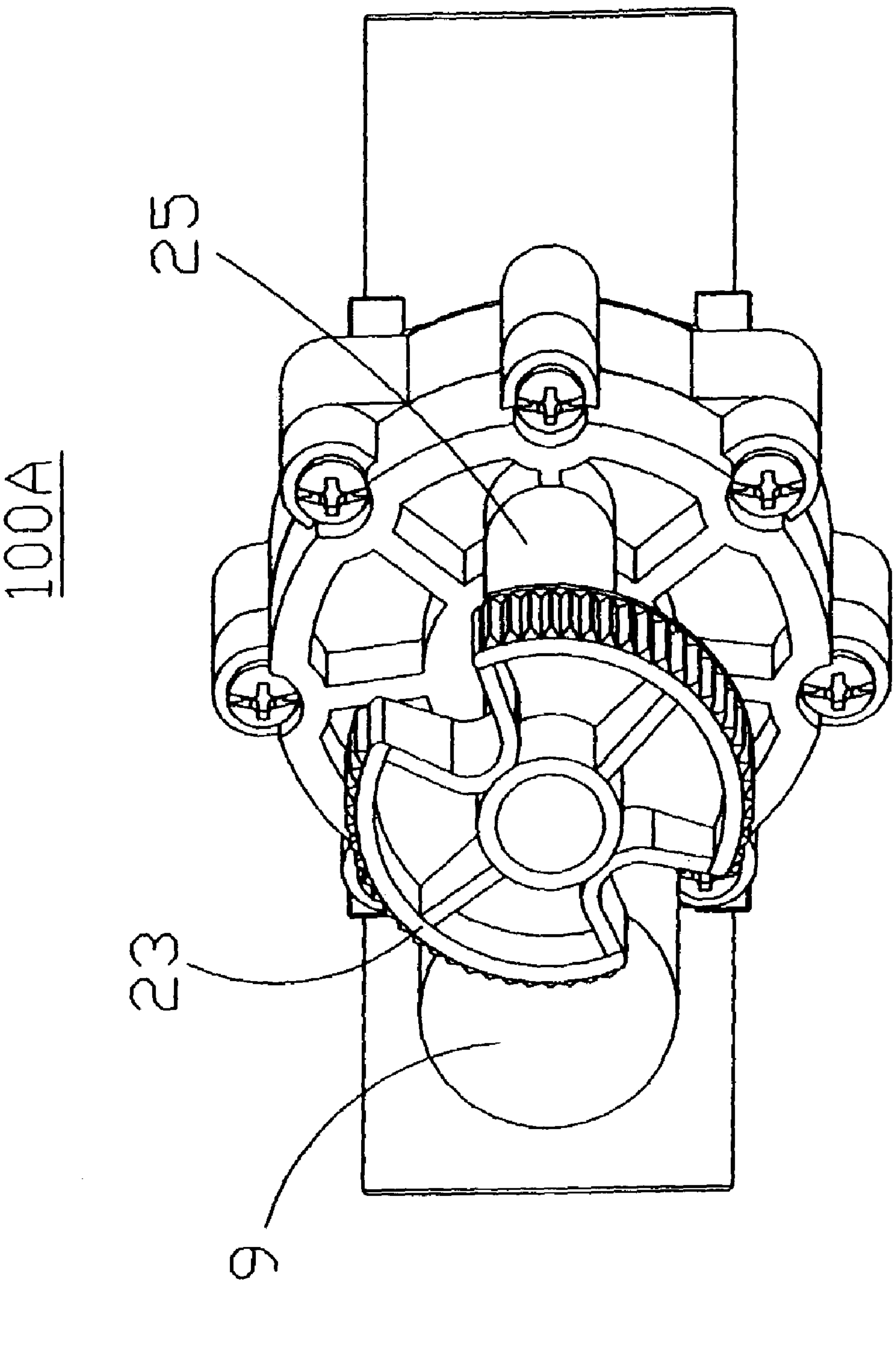
FIG. 4 is a top view of a flow control valve of FIG. 3.

As illustrated in FIGS. 3 and 4, in a second embodiment, which is a variant of the first embodiment shown in FIGS. 1 and 2, a valve 100A may include, in addition to the solenoid operated pilot control valve 9, a manual throttle generally denoted at 21 described in more detail below. Throttle 21 includes an operating handle 23 attached to a rotatable stem 25.

Figure 5:
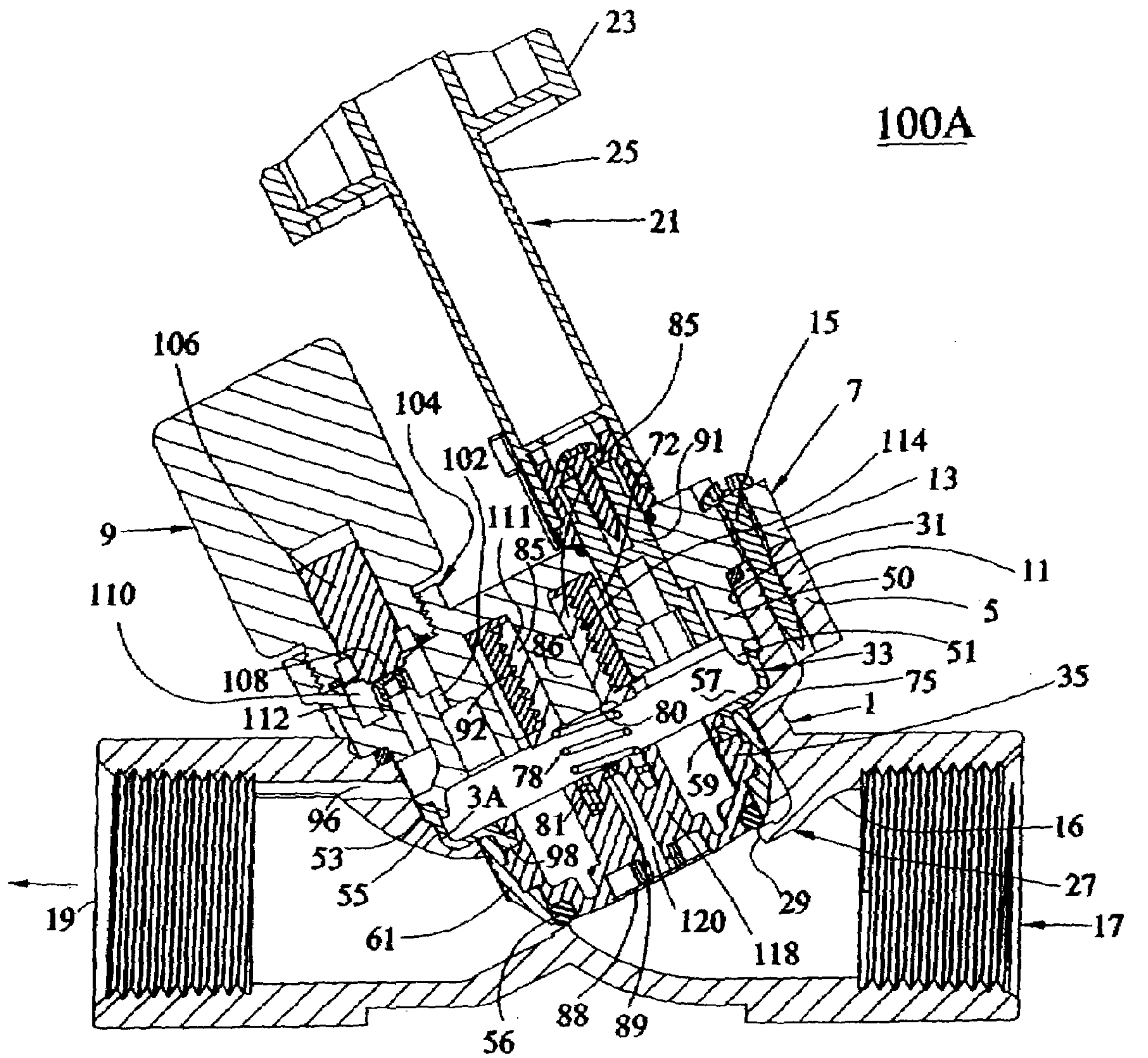
FIG. 5 is a sectional side view of the valve shown in FIGS. 3 and 4 in which the valve is shown in the closed position.
Figure 5A:
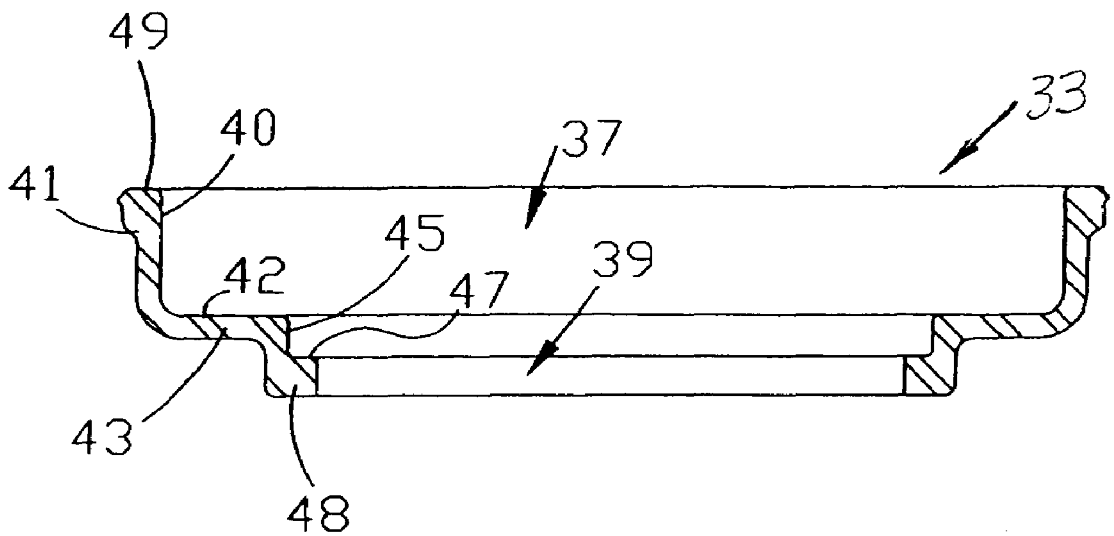
FIG. 5A is a cross-sectional view of a stepped diaphragm according to the invention.
Figure 5B:
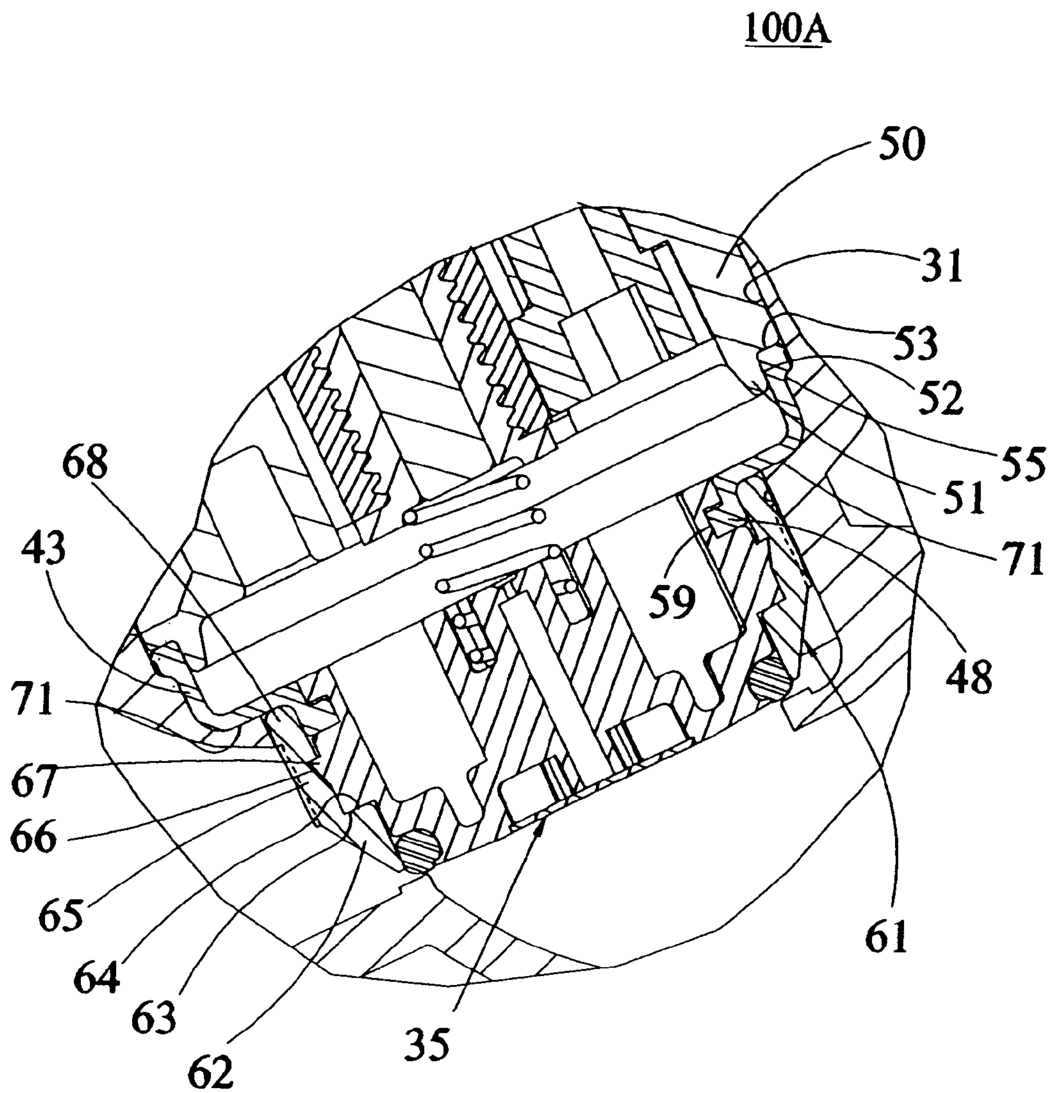
FIG. 5B is an enlarged view of a portion of FIG. 5.

The details of the construction of valve 100A are illustrated in FIGS. 5, 5A, and 5B. As shown, main valve body 1 has an inlet 17 and an outlet 19, separated by a partition 27. A circular opening 29 provides communication between inlet 17 and outlet 19, and serves as a valve seat as described below. Inlet 17 and outlet 19 are aligned to provide a substantially straight-through flow passage.

A diaphragm 33 and a valve top member and plug 35 are positioned in a circular passage 31 in the main valve body upward extension 5 located above the flow path. As shown in FIG. 5A, diaphragm 33 is a generally cylindrical resilient member having an upper cup-like portion 37 and a lower cup-like portion 39. Upper portion 37 is defined by an inner surface 40 of an axial wall 41 of diaphragm 33, and by an upper surface 42 of a transverse annular bottom wall 43. Lower portion 39 is defined by the radially inner axial end surface 45 of wall 43, and an axially upper surface 47 of a transverse annular bottom wall 48. An annular shoulder or flange 49 extends radially outward at the top of upper portion 37, while transverse annular bottom wall 48 defines an inwardly extending flange at the bottom of lower portion 39.

Referring particularly to FIGS. 5A and 5B, a generally cylindrical portion 50 extending downwardly from valve top member 7 is positioned within circular passage 31. The lower end of cylindrical portion 50 terminates in an undercut surface that defines a radially extending shoulder 53. Inwardly of shoulder 53, the reduced diameter end of cylindrical portion 50 forms a lip 51, the outer surface 52 of which engages the upper end 40 of the inner surface of diaphragm axial wall 41 (see FIG. 5*a*). Slightly below the level of shoulder 53, the inside diameter of circular passage 31 is reduced to form another radial shoulder 55 in axial opposition with shoulder 53. These surfaces, together with lip 51 and the opposed portions wall 31, provide a recess within which lip 49 at the top of upper cup 37 is received, with the thickness of lip 51 being sized to control the shape of diaphragm 33 when the valve opens, as described below. Capture of the upper end of diaphragm 33 in valve body opening 31 between lip 51 of top member shoulder 55 in this area forms a seal for the top of the valve body.

Valve closure member or plug 35 is slidably mounted in valve body passage 31, and carries an O-ring 56 at its bottom end which engages with valve opening 29 to close the valve. The movement of plug 35 within valve body passage 31 is controlled by pressure differential between valve inlet side 17 and a pressure chamber 57 within control housing 3.

Diaphragm 33 provides a seal for pressure chamber 57. As described above in connection with FIG. 5A, shoulder 49 at the upper end of diaphragm 33 is retained between lip 51 on cylindrical portion 50 and shoulder 55 of circular passage 31. The inwardly extending shoulder 48 formed by lower portion 39 of diaphragm 33 is received in a groove 59 in valve plug 53, and is securely affixed by a snap-on retaining ring 61. As best illustrated in FIG. 5B, retaining ring 61 includes a lower tapered portion 62 having an inwardly extending shoulder 63 that engages with a outwardly extending shoulder 64 on plug 35. Above tapered portion 62, there is an upwardly extending cylindrical skirt portion 65, the inner surface of which is notched at 66. An outwardly extending peripheral prong 67 on the axial surface of plug 35 snap fits in notch 66 to retain snap ring 61 in place.

Skirt 65 continues above notch 66 and terminates in a rounded upper end portion 68 that traps shoulder 48 in groove 59, thereby sealing diaphragm 33 against plug 35.

As illustrated in FIGS. 5 and 5B, when the valve is closed, the outer surface 70 of diaphragm wall portion 43 rests against a radial shoulder 71 formed below shoulder 55 on the inside of circular passage 31. This provides support for wall 43 against the pressure in chamber 57.

Below shoulder 71, the diameter of lower end 75 is reduced to provide a clearance only large enough to accommodate the valve plug with allowance for axial guide ribs formed by indentations on skirt 65 of diaphragm retaining ring 61, and to provide for dirt clearance.

The construction illustrated assures that inside and outside shoulders 48 and 49 of diaphragm 33 are securely captured so that neither the movement of the diaphragm with valve plug 35 nor pressure forces can cause the diaphragm to be pulled free and break the seal for pressure chamber 57. At the same time, the reliability of the seal reduces manufacturing process tolerances, and permits fabrication of most of the valve parts out of molded plastic.

It has been determined that the diameter of valve plug 35 relative to the diameter of valve seat opening 29 should be such that the area of plug 35 on which the pressure differential in pressure chamber 57 acts is between about 1.5 and 2.0 times the area of opening 29. This assures that the pressure force mechanical advantage for seating the valve plug is adequate to provide a tight seal when the valve is closed without subjecting the diaphragm 33 to a continuous pressure load. The travel of valve plug 35 is selected to provide an opening area clearance equal to the flow area of the valve's seat opening 29. The length of the axially stepped portion 41 of diaphragm 33 is designed to accommodate the required valve plug travel by folding up on itself when the valve opens as described in connection with FIG. 6 below. A very compact reduced diameter diaphragm is completely pressure supported when the valve is closed for low stress in the diaphragm material.

The side walls on the inlet side 17 are sloped at 16 towards the valve seat opening 29 to smoothly channel flow through the valve body 1 with minimum turbulence.

Attachments to inlet 17 and outlet 19 of valve body 1 are made by engaging the internal threads at 18 and 20 respectively with male exterior pipe threads (not shown). Wrench flats 17*b* and 19*b* on valve body 1 may be provided to facilitate this.

Alternatively, pipes of the next larger size can be slip fitted onto and glued to the outer portions 17*a* and 19*a* respectively, of value inlet 17 and outlet 19. The flow through the valve in this case see the inside thread diameter which is approximately the inside pipe diameter of the next large size pipe. In this case the valve flow is not restricted by the internal threaded pipe.

Referring still to FIG. 5, solenoid 9 is threadedly attached to an internally threaded mounting boss 104. The solenoid armature 106 functions as an actuator to open and close a pilot valve or venting port 108 whose operation will be later described. Armature 106 is normally in an extended position, which closes venting port 108. When a solenoid 9 is energized, the armature 106 is retracted to open venting port 108. The open volume 110 surrounding venting port 108 in top member 7 communicates with pressure chamber 57 by passage 102. Venting port 108 also communicates through a passage 112 in valve top member 7 with a venting passage 96 which opens into valve outlet 19. Thus, when solenoid 9 is energized, and port 108 is opened, pressure chamber 57 is vented to the outlet side of the valve.

Valve throttling mechanism 21 is also housed in top member 7. This includes a driving gear 91 connected to stem 25, a driven gear 92, and an axially movable throttling plug 85. Driven gear 92 is internally threaded and engages with external threads 114 on throttling plug 85. A hexagonal pin 86 extending down from the upper end of valve top member 7 fits slidingly into a hexagonal recess 116 in throttling plug 85. This prevents plug 85 from turning with driven gear 92, thereby constraining it to move up or down on pin 86.

A spring 78 positioned between the bottom of plug 85 and an axially aligned central portion 118 of valve plug 35 biases valve plug 35 toward the closed position illustrated in FIG. 5. Spring 78 is retained in position by a recess 80 on the bottom of throttling cylinder 85, and by groove a groove 81 in valve plug central portion 118, the depth of which is sufficient to receive substantially the entire compressed length of spring 78. As will be understood, the axial position of throttling plug 85, as determined by the rotation of handle 23, determines the maximum upward travel of valve plug 35, and consequently, the maximum flow area for valve opening 29.

Extending axially from the bottom of valve plug 35 is a bleed passage 120 which terminates at its upper end in a bleed orifice 89. A filter screen 88 covers the opening of passage 120 to prevent entry of dirt or other particles. Location of screen 88 along the bottom of valve plug 35 is particularly advantageous as it places the screen parallel to the flow path, where it does not contribute to turbulence or expose the screen to possible damage. Also, during opening and closing of the valve, the flow velocities are very high due to the flow throttling high pressure differential across the valve plug. The high-velocity flow is quite effective in removing any dirt adhering to the screen 88.

Spring bias of the valve plug assembly 35 toward the closed position insures that the valve will close under all flow conditions. The spring bias insures that at least a small pressure differential is produced across the diaphragm when solenoid 9 is de-energized, and armature 106 extends and closes off venting port 108. A bleed flow through screen 88 and bleed orifice 89 will thus tend to flow from the inlet side 17 of the valve to the control side of diaphragm 33 to fill pressure chamber 57 above diaphragm 33 and cause the valve to close FIG. 5 shows valve 100A in the closed position. Here, with venting port 108 closed off as described above, communication from valve inlet 17 through passage 120 and bleed hole 89, causes pressure chamber 57 behind diaphragm 33 to become pressurized. The resulting force, together with that provided by spring 178, moves valve plug 35 to its fully extended position, and O-ring 56 engages with the margin of valve opening 29 to block the flow of fluid from valve inlet passage 17 to valve outlet passage 19.

Figure 6:
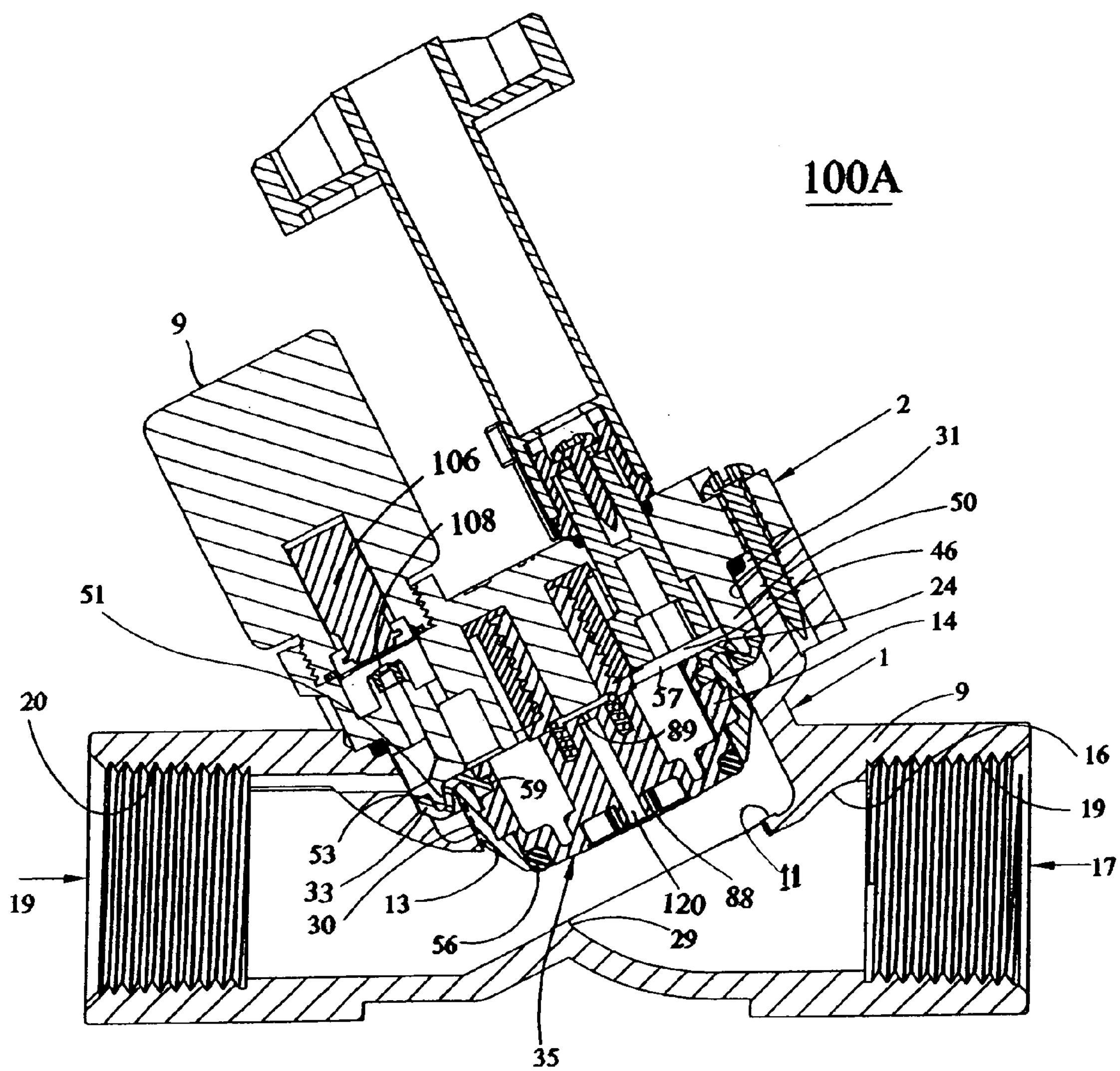
FIG. 6 is a sectional side view similar to FIG. 5 in which the valve is shown in the open position.

FIG. 6 shows valve 100A in its open position. Here, with solenoid 9 energized, armature 106 is retracted, and venting port 108 is opened. Now, even though pressure chamber 57 is still connected to valve inlet 17 by filter screen 88, passage 120, and bleed opening 89, with pressure chamber 57 vented to the valve outlet 19 though passages 112 and 96, the pressure behind diaphragm 33 is low enough for the pressure on the inlet side is sufficient to overcome the bias of spring 78. This causes valve plug 35 to move upward, thereby unblocking valve opening 29, and allowing the flow of fluid through the valve.

As will be appreciated by those skilled in the art, the pressure in chamber 57 can be controlled in ways other than that described above, such as described in the above-referenced U.S. Pat. No. 5,645,264.

Pilot valve venting port 108 is preferably about 0.045–0.060 inches in diameter, while bleed hole 89 is normally only about 0.030 inches in diameter. This provides an area ratio of about 3:1 to 4:1, and sufficient venting capability for pressured chamber 57 when the valve is opened that there is no need for the additional complexity of a mechanism to shut off the bleed flow.

Also, as illustrated in FIG. 6, when the valve is open, valve plug 35 is in its axially upper position, and carries diaphragm shoulder 48 up with it. This causes diaphragm wall 43 to lift away from shoulder 71 and to fold upward in the direction of movement of valve plug 35 until it contacts lip 51, and to assume a generally U-shape. This serves to control the active diaphragm shape when the valve is open. The movement of plug 35 is thus accommodated while keeping the outside diameter of diaphragm 33 to a minimum. The diaphragm outside diameter is kept to a minimum by extending diaphragm 33 downwardly an amount equal to approximately half the desired valve plug travel plus the thickness of the diaphragm. The diaphragm material in the stepped portion is then available to allow valve plug 35 to travel an approximately equal distance above the diaphragm neutral plane while not requiring the diaphragm length to be stretched. The outside of the bend radius of diaphragm 33 is stretched while the inside of the radius is compressed. Pressure stresses in diaphragm 33 are thus reduced by the smaller radial size of the exposed area of diaphragm 33 that is unsupported during valve operation.

The inner portion of wall 43 of diaphragm 33 travels substantially axially with valve plug 35 as it remains supported by end portion 68 of skirt 65, and by shoulder 48 in groove 59. As plug 35 moves, the lower end of axial wall 41 folds around lip 51, but does not stretch. So that there is sufficient material in radial wall 43 to assure this, it is found that the length of radial wall 43 should be at least twice the thickness of the diaphragm wall.

In the illustrated embodiments, there is only about 0.250 inches of diaphragm radial length involved to provide 0.30 inches of valve plug travel. The diaphragm may be molded 0.040–0.050 thick. This diaphragm thickness and relatively small active diaphragm diameter allows the diaphragm to be molded with no fabric required for added strength.

In addition, the diaphragm geometry shown assures that upper radial wall 43 is totally supported from the underside against pressure on the top of the diaphragm during the valve's long off periods.

Figure 7:
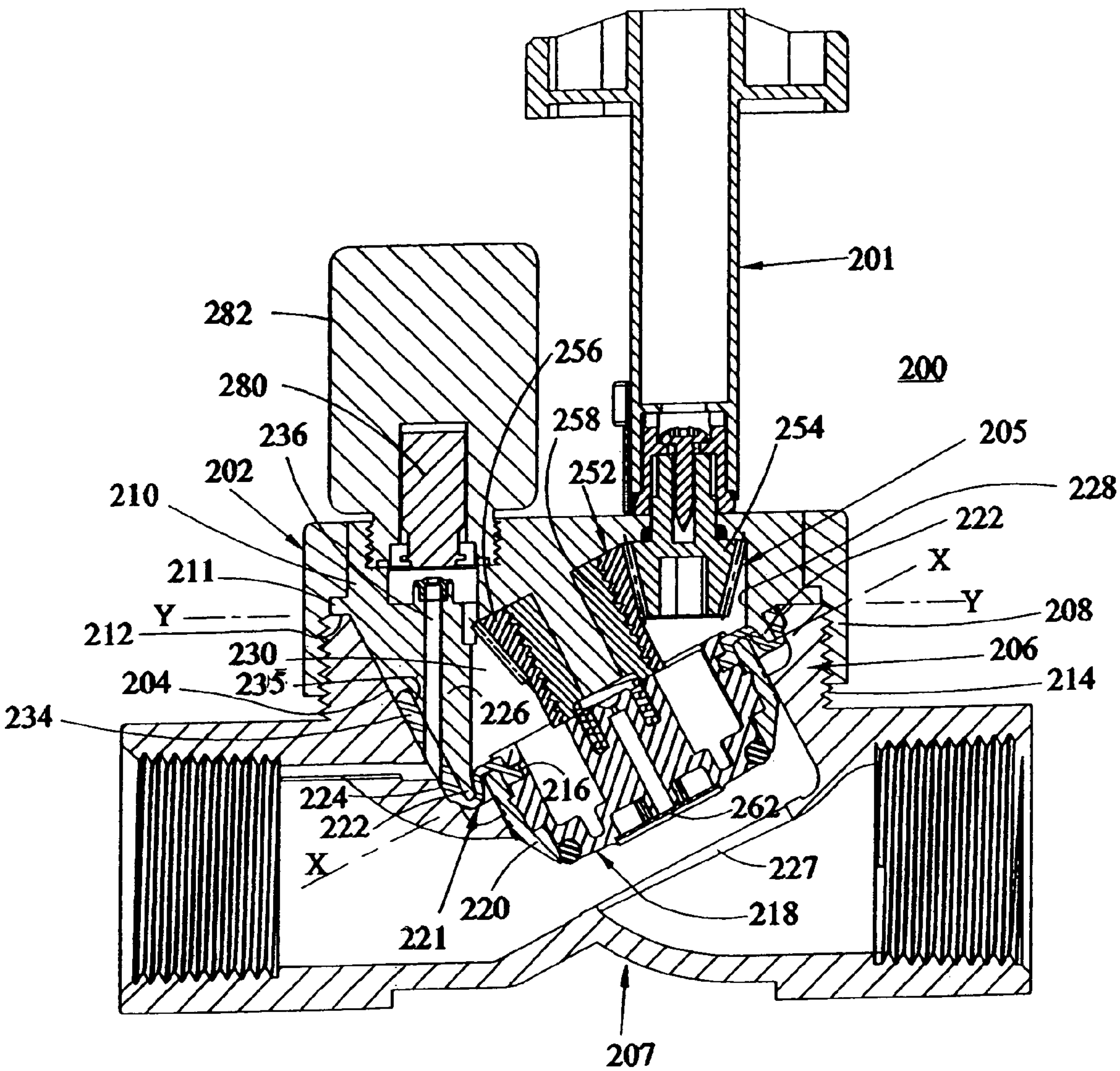
FIG. 7 is a sectional side view of a further embodiment of the invention having a tilted valve seat, diaphragm and valve plug with a valve body access closure that extends parallel to the valve flow axis.

A third embodiment of the invention is illustrated in FIG. 7. This valve, generally denoted at 200, is particularly simple to assemble and to disassemble, if necessary, for service in the field.

As illustrated, valve is similar to those of the first and second embodiments, but the valve top is now split into an insert portion 210, which is received in a cavity 204 formed by an upward extension 206 of main valve body 207, and a cover portion 202. Insert 210 is supported by a circular flange 211 on a flat upper surface 212 of body 204 which lies in a plane Y-Y that is parallel to the flow axis of valve 200. Body insert 210 is retained within cavity 204 by an internally threaded skirt 208 that extends down from cover portion 202 and engages with external threads 214 on main valve body extension 206.

A cupped stepped diaphragm 221, similar to diaphragm 33 employed in the first and second embodiments, is attached at its lower end 216 to a valve plug 218 by a retaining ring 220 as previously described. At its upper end, diaphragm 221 is trapped between the internal side wall 224 of cavity 204, and a lip 222 extending from the bottom of a closure flange 226 on the lower end of body insert 210. Lip 222 extends in a direction perpendicular to the plane of a slanted valve opening 227, i.e., parallel to the axis of valve plug 218, from the radially inner side wall 228 of body insert 210. Wall 228 also forms a pressure cavity 230, which, by the sealing action of diaphragm 221, provides the operating pressure differential for the valve.

Body insert 210 is asymmetrical as illustrated in FIG. 7 to accommodate the vertical orientation of an actuator 280 of a solenoid 282 as described below. The relief passage 236 for pressure cavity 230 also extends vertically through closure flange 226. A tongue 234 extending from the portion of diaphragm 221 adjacent to relief passage 236 in a groove 235 in closure flange 226 provides a seal for relief passage 236.

As in the previously described embodiments, lip 222 serves to control the active diaphragm shape when the valve is open, and the diaphragm thickness and relatively small active diaphragm diameter allows the diaphragm to be molded with no fabric strengthening required.

In this embodiment, the valve stem 201 of a throttle 252 is oriented vertically, i.e., perpendicular to the flow axis rather than at the tilt angle as in the second embodiment. This is achieved by use of a beveled gear mechanism 205 including a driving gear 254 attached to valve stem 201 and a driven gear 256 coupled to a throttle plug 258. The low pressure drop advantage of the tilted diaphragm orientation and the compact valve body size are thus preserved, while providing the convenience of the vertical orientation for throttle 252.

Likewise, the self-cleaning of valve bleed orifice filter 262 due to its location at the bottom of valve plug 35, as previously described, is also achieved in this embodiment, and elimination of screws to secure the valve top plate simplifies assembly and disassembly.

Figure 8:
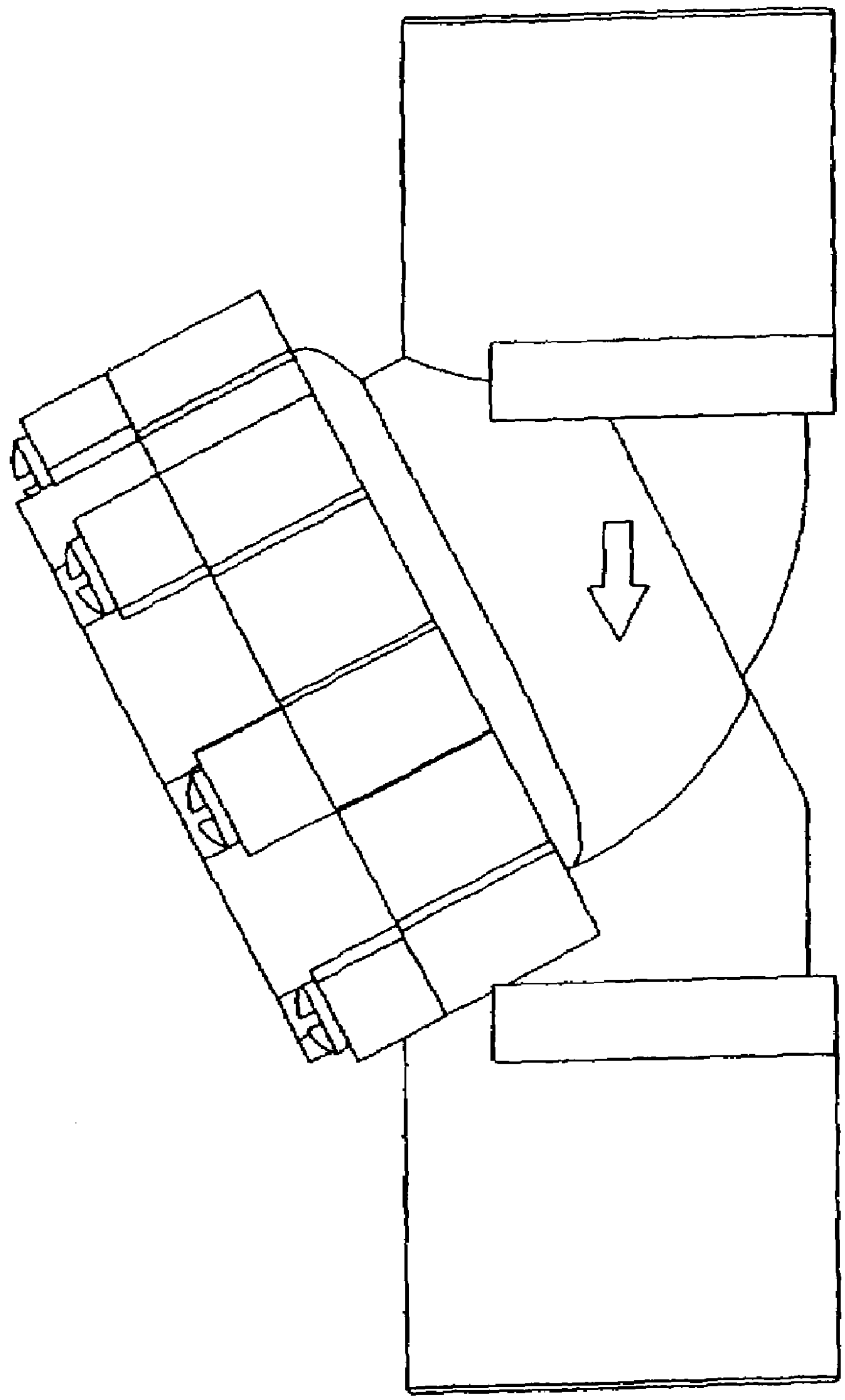
FIG. 8 is a side view of further embodiment of the flow control valve according to the invention having solely hydraulic control.
Figure 9:
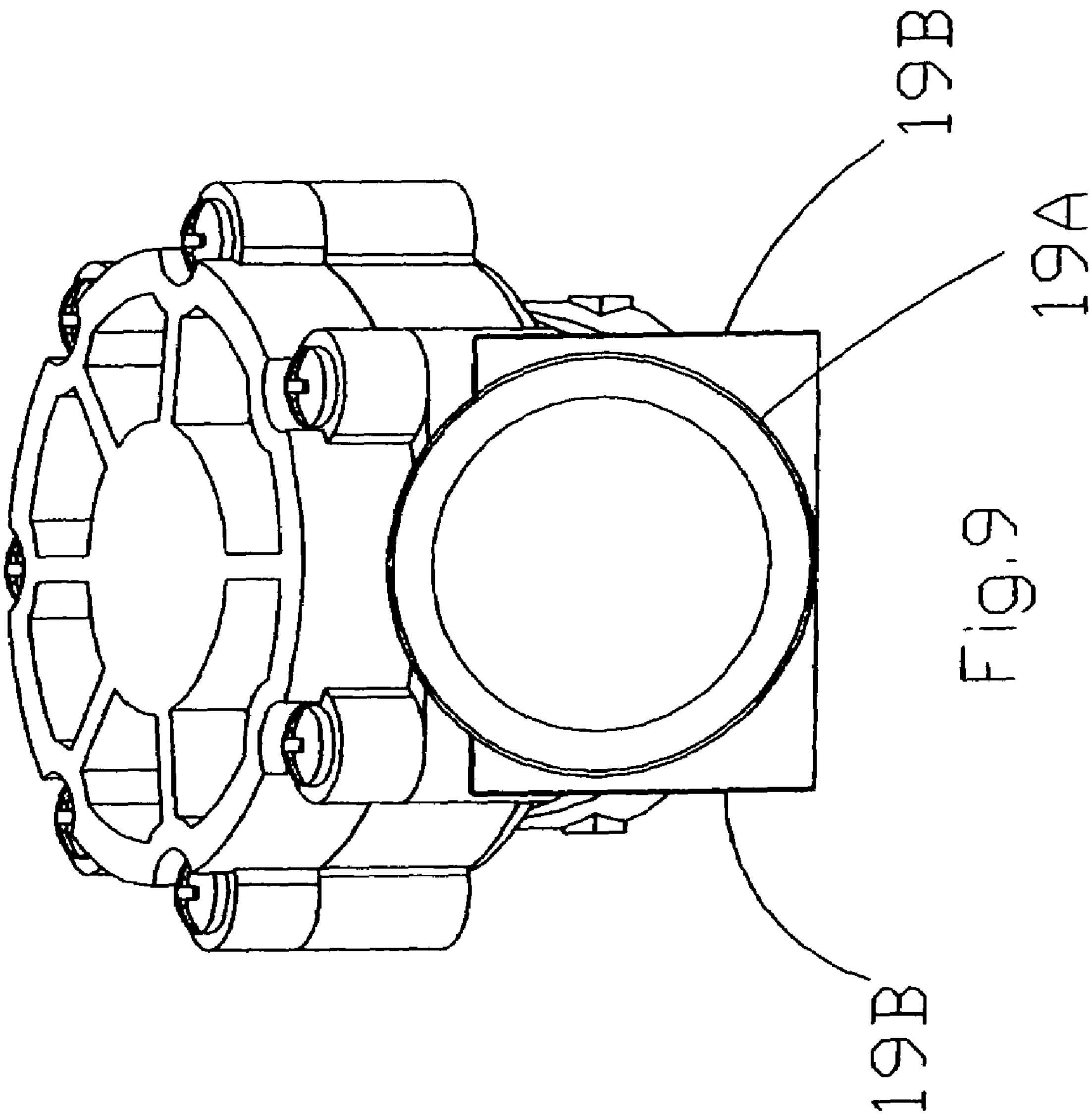
FIG. 9 is an exit end view of a flow control valve of FIG. 8.

In the three embodiments described above, the pilot valve function is activated by a solenoid, but as will be appreciated by those skilled in the art, remote hydraulic pilot operation is also possible. FIGS. 8 and 9 illustrate the external features of such a remotely operated valve generally denoted at 300. As in the case of the other embodiments described above, valve 300 includes a main valve body 1, a control housing 3 formed by an upward extension 5 of main body 1, and a top member 7, an inlet 17 and an outlet 19. There is, however, no provision for a solenoid as in the valves of FIGS. 1–7.

Although the present invention has been described in relation to particular embodiments thereof, many other variations and modifications and other uses will become apparent to those skilled in the art. For example, it should be recognized that the benefits of the stepped diaphragm design are not limited to valves of the type illustrated, but can be used in other conventional valve configurations as well. It is intended, therefore, that the present invention not be limited by the specific disclosure herein, but only by the appended claims.

What is claimed is:

1. A fluid flow control valve comprising:

a housing;

a fluid inlet;

a fluid outlet;

a fluid passage between the inlet and the outlet;

a valve seat area oriented obliquely in the fluid passage;

a valve closure member movable perpendicularly to the valve seat area to close and open the valve;

a sealing diaphragm for the valve closure member; and a throttle mechanism, the throttle mechanism including:

a throttling member linearly movable in the direction of movement of the valve closure member;

a rotatable operating shaft that extends in a direction perpendicular to the fluid passage; and a coupling mechanism between the operating shaft and the throttling member that converts rotation of the operating shaft to linear movement of the throttling member.

2. A fluid flow control valve according to claim 1, wherein the coupling mechanism comprises cooperating bevel gears on the operating shaft and the throttling member.

3. A fluid flow control valve according to claim 1, wherein the valve closure member is operable by differential pressure thereacross; and further including:

a bleed passage for adjusting the differential pressure; and a filter screen for the bleed passage, the filter screen being so positioned that the screen is cleaned by the flow of fluid across, rather than through, its surface.

4. A fluid flow control valve according to claim 3, wherein the filter screen is positioned in flat alignment with a surface of the valve closure member that seals the valve port opening.

5. A fluid flow control valve according to claim 2, further including a sealing diaphragm connected between the closure member and the valve body to maintain the differential pressure;

the diaphragm having a first portion which is disposed axially when the valve is closed, and a second portion that is disposed radially when the valve is closed, the second portion being attached to and movable with the closure member to cause the first portion to fold in the direction of movement of the closure member when the valve is opened.

6. A fluid flow control valve according to claim 5, wherein the first portion of the diaphragm becomes approximately U-shaped when the valve is opened.

* * * * *